US009587538B2

(12) United States Patent
Clayton, Jr. et al.

(10) Patent No.: US 9,587,538 B2
(45) Date of Patent: Mar. 7, 2017

(54) EXHAUST AFTERTREATMENT SYSTEM WITH SILICA FILTER

(71) Applicant: Caterpillar Inc., Peoria, IL (US)

(72) Inventors: Robert D. Clayton, Jr., Peoria, IL (US); Derek Dilts, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/071,319

(22) Filed: Mar. 16, 2016

(65) Prior Publication Data

US 2016/0194991 A1 Jul. 7, 2016

Related U.S. Application Data

(63) Continuation-in-part of application No. 14/510,138, filed on Oct. 9, 2014, now abandoned.

(51) Int. Cl.

| | |
|---|---|
| *B01D 50/00* | (2006.01) |
| *F01N 3/022* | (2006.01) |
| *F01N 3/023* | (2006.01) |
| *F01N 3/035* | (2006.01) |
| *B01D 53/94* | (2006.01) |
| *B01D 46/30* | (2006.01) |
| *F01N 3/28* | (2006.01) |

(52) U.S. Cl.
CPC ........... *F01N 3/0224* (2013.01); *B01D 46/30* (2013.01); *B01D 53/944* (2013.01); *B01D 53/9431* (2013.01); *F01N 3/0237* (2013.01); *F01N 3/035* (2013.01); *F01N 3/2803* (2013.01); *F01N 2250/02* (2013.01); *F01N 2330/00* (2013.01); *F01N 2330/30* (2013.01); *Y02T 10/24* (2013.01)

(58) Field of Classification Search
CPC ...... F01N 2/023; F01N 2330/30; F01N 3/022; B01D 46/30; B01D 53/94
USPC .................................................. 422/169, 183
See application file for complete search history.

(56) References Cited

U.S. PATENT DOCUMENTS

| | | | |
|---|---|---|---|
| 6,365,108 B1 | 4/2002 | Philyaw | |
| 7,393,381 B2 * | 7/2008 | Tower ..................... | B01D 53/02 95/11 |
| 2004/0198844 A1 * | 10/2004 | Straguzzi ................. | C07C 2/84 518/703 |
| 2008/0179177 A1 * | 7/2008 | Cha ........................ | B01D 53/44 204/157.43 |
| 2012/0011833 A1 * | 1/2012 | Kamei ................... | E02F 9/0866 60/297 |

(Continued)

*Primary Examiner* — Tom P Duong
(74) *Attorney, Agent, or Firm* — Fahlberg Law (57) ABSTRACT

An exhaust system including an upstream portion, a downstream portion, a service access, and a silica filter defines an exhaust gas flow path. The downstream portion includes an aftertreatment component. The service access is between the upstream portion and the downstream portion. The silica filter includes a silica filter element and a housing enclosing the silica filter element. The housing includes a filter gas inlet and a filter gas outlet, and defines a filter flow path through the silica filter element between the filter gas inlet and the filter gas outlet. The silica filter element is configured to filter silica from exhaust gases of the engine and structured to create a uniform distribution of silica throughout the silica filter element. The silica filter is configured to be removed and replaced through the service access. The exhaust gas flow path includes the filter flow path.

18 Claims, 7 Drawing Sheets

(56) References Cited

U.S. PATENT DOCUMENTS

2014/0150450 A1* 6/2014 Golin ................ F01N 13/1805
                                                        60/796
2015/0023844 A1   1/2015 Clayton, Jr.

* cited by examiner

FIG. 2

EXHAUST AFTERTREATMENT SYSTEM WITH SILICA FILTER

PRIORITY

This application claims priority to U.S. patent application Ser. No. 14/510138, entitled "Siloxane Filter in Exhaust Aftertreatment System", and filed Oct. 9, 2014.

TECHNICAL FIELD

The present disclosure generally relates to exhaust aftertreatment systems. More particularly, the present disclosure relates to a silica filter in an exhaust aftertreatment system

BACKGROUND

Indoor and outdoor waste transfer stations, and landfill operations are a major part of waste management. During operations at waste transfer stations, waste may be delivered via waste collection vehicles. The waste may include certain domestic products containing siloxanes which are non-toxic silicon-bearing organic compounds. After the waste is delivered and/or unloaded at waste transfer stations the waste may be moved, compacted, or in other ways managed with work machines, and then loaded onto other vehicles for further transport. When the waste is unloaded on a surface area of the landfill site, work machines, such as compactors or bulldozers, may be used to spread and compact the waste over the surface area. Due to the widespread use of domestic products containing siloxanes, siloxane concentration may gradually increase at the waste transfer sites, and landfill sites.

The small siloxanes are volatile compounds that evaporate and migrate into the ambient air. The work machines that operate at the waste transfer stations and/or in the landfill sites may draw siloxanes from the surrounding environment into air intakes such as engine air intakes. The problem may be more acute at the indoor waste transfer stations as it is more difficult for the siloxanes to dissipate into the environment. The siloxanes may combust in the engine and form silica. The silica may be in the form of molecular silica, which acts like a gas species, and diffuses in the exhaust gases. The silica may come into contact with surfaces inside the engine and/or in an exhaust system of the engine. When the silica comes into contact with the engine or exhaust system surfaces, the silica may condense and form solid silica deposits that may accumulate. The silica deposits may build up on exhaust aftertreatment components leading to restriction of the exhaust flow, which may increase backpressure to the engine, causing an increase in regeneration frequency. Additionally, sensors can be coated or plugged, causing inaccurate readings or delayed response. High concentrations of siloxanes in the ambient air may severely affect the maintenance intervals of the engine and/or work machine. This may lead to more downtime and more parts to replace.

Owners and/or operators of work machines used at a waste transfer station and/or a landfill may perform maintenance functions on the work machines at regular service intervals. Designing parts of the engine aftertreatment system and other systems on these work machines such that any necessary maintenance may be done at these regular service intervals may prevent down-time and limit maintenance expense. Engine system filters may be designed for changing during each or some of the regular service intervals.

U.S. Pat. No. 6,365,108 discloses siloxane filter system for protecting an oxygen probe utilized in an internal combustion engine fueled by biogases. The filter system has a stainless fiber filter removably disposed in a housing having and inlet port and an outlet port disposed in fluid communication with an exhaust duct in such a manner as to cause exhaust gases to flow through the housing and filter. The oxygen probe is disposed in the housing downstream of the filter, causing siloxane in the exhaust gases to be deposited on the stainless fibers of the filter and essentially siloxane free gases to pass over the oxygen probe extending its useful life.

SUMMARY OF THE INVENTION

In one aspect of the disclosure, an exhaust system for an engine defining an exhaust gas flow path from the engine to an outside environment includes an upstream portion, a downstream portion, a service access, and a silica filter. The downstream portion includes an aftertreatment component. The aftertreatment component includes at least one of a diesel particulate filter, a diesel oxidation catalyst, a lean NOx trap, a lean NOx catalyst, a NOx adsorber, and a selective catalytic reduction catalyst. The service access is between the filter upstream portion and the filter downstream portion. The silica filter includes a silica filter element and a housing enclosing the silica filter element. The housing includes a filter gas inlet and a filter gas outlet and defines a filter flow path through the silica filter element between the filter gas inlet and the filter gas outlet. The filter element is configured to filter siloxanes from exhaust gases of the engine and structured to create a uniform distribution of siloxanes throughout the silica filter element. The silica filter is configured to be removed and replaced through the service access. The exhaust gas flow path includes the filter flow path.

In another aspect of the disclosure a silica filter for an exhaust system of an engine includes a silica filter element, and a filter housing. The exhaust system includes an aftertreatment canister with a silica filter compartment, a removable service access cover providing access to the silica filter compartment, and at least one aftertreatment component. The canister defines a canister flow path flowing through the silica filter compartment and the aftertreatment component. The filter housing encloses the filter element and includes a filter gas inlet and a filter gas outlet. The filter housing defines a filter flow path through the silica filter element between the filter gas inlet and the filter gas outlet. The filter housing is configured to be removably placed within the silica filter compartment through the service access cover such that the canister flow path includes the filter flow path.

In another aspect of the disclosure, a silica filter for an exhaust system of an engine includes a silica filter element and a filter housing enclosing the silica filter element. The exhaust system includes an aftertreatment component, a first conduit with a first connection portion, and a second conduit with a second connection portion. The first connection portion is configured to fixedly connect and disconnect with the second connection portion creating a service access upstream of the aftertreatment component. The exhaust system defines an exhaust flow path from the engine to an outside environment through the first conduit, the second conduit, and the aftertreatment component. The filter housing includes a filter gas inlet, and a filter gas outlet, and defines a filter flow path through the silica filter element between the filter gas inlet and the filter gas outlet. The filter housing is configured to be fixedly and removably placed within at least one of the first conduit and the second conduit through the service access such that the exhaust flow path includes the filter flow path.

DETAILED DESCRIPTION

The following detailed description includes the best currently contemplated mode and other exemplary embodiments. The description is not to be taken in a limiting sense, but is made merely for the purpose of illustrating general principles, since the scope is best defined by the appended claims.

Various features are described below that can each be used independently of one another or in combination with other features. However, any single feature may not address any of the problems discussed above, or may only address one of the problems discussed above. Further, one or more of the problems discussed above may not be fully addressed by any of the features described below.

Figure 1:
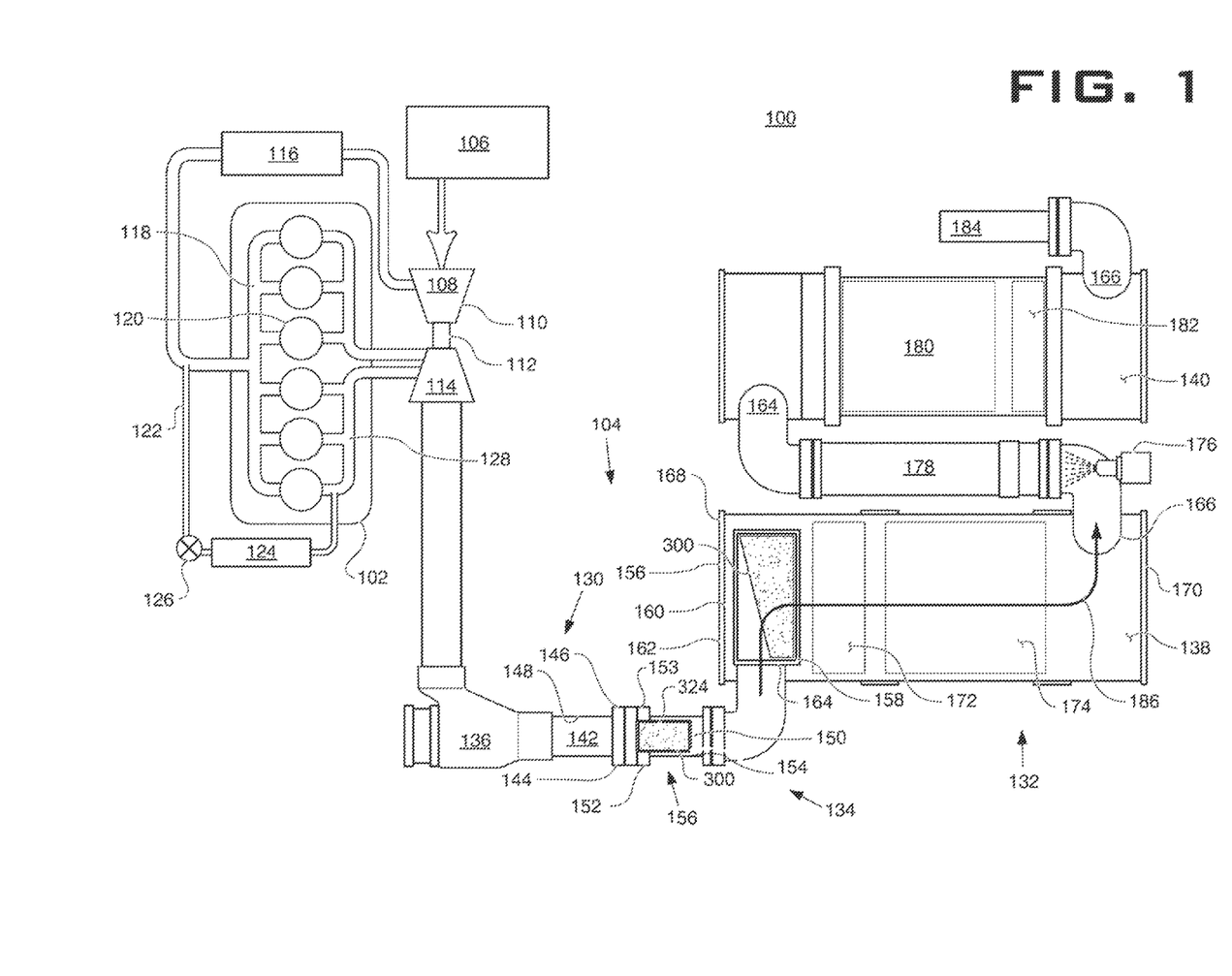
FIG. 1 is a schematic of an engine system, according to an exemplary embodiment of the present disclosure.

Referring now to FIG. 1, an engine system 100 with an engine 102 and exhaust system 104 is illustrated. The engine 102 may be an internal combustion engine such as a diesel piston engine, a gasoline piston engine, a rotary engine, a turbine engine, or any other engine which may emit exhaust gases with silica which may need to be filtered before the exhaust gases flow through aftertreatment or other components, and/or are emitted into the environment. The engine 102 illustrated is a six (6) piston engine, but other types of engines 102 are contemplated. The system 100 may have an air intake 106 to provide intake air for the combustion process of the engine 102. The air intake 106 may be fluidly connected to a compressor 108 which may compress the intake air before it enters combustion chambers 120 of the engine 102. The compressor 108 may be part of a turbocharger 110 and be driven through a driving connection 112 by a turbine 114. In alternative embodiments the system 100 may have a different type compressor 108 such as a supercharger (not shown), or no compressor at all.

The compressor 108 may be fluidly connected to an intake air cooler 116 such as an air to air aftercooler (ATAAC). The air cooler may cool the compressed air before the compressed air enters the combustion chamber 120 through an intake manifold 118. In the combustion chambers 120 the compressed air may be mixed with fuel and ignited through compression and/or spark ignition. Exhaust gases from the combustion may flow from the combustion chamber 120 into an exhaust manifold 128. Exhaust gases may flow from the exhaust manifold 128 to the exhaust system 104 and/or through an exhaust gas recirculation (EGR) system 122. In the EGR system 122 exhaust gases may be cooled by an EGR cooler 124 and an EGR valve 126 may selectively route the exhaust gases to mix with the intake air and enter the combustion chambers 120. The exhaust system 104 may define an exhaust gas flow path from the engine 102 to the outside environment.

The intake air may contain siloxanes, especially if the system 100 is operating in certain environments, such as, for example, a waste transfer station and/or a landfill. The siloxanes may enter the combustion chambers 120, and combust to form silica. The silica may be in molecular form, depending on the concentration of siloxanes in the air intake. The silica then enter the exhaust system 104 with exhaust gases. The exhaust system 104 may include an aftertreatment system 134 with aftertreatment components which may become blocked or otherwise damaged by silica in the exhaust gases. The aftertreatment components may, for example, include a diesel oxidation catalyst (DOC) 172, a diesel particulate filter (DPF) 174, a selective catalytic reduction catalyst (SCR) 180, an ammonia oxidation catalyst (AMOX) 182. Other aftertreatment components, such as, but not limited to, a lean NOx trap (not shown), a lean NOx catalyst (not shown), a NOx adsorber (not shown), and/or other aftertreatment components as known in the art may also or alternatively be included in the aftertreatment system 134. One or more silica filters 300 may be disposed in the exhaust system 104 to filter some or all of the silica from the exhaust gases. The placement of the silica filters 300 in the exhaust system 104 may prevent the blocking and/or other damage of the aftertreatment system 134. Maintenance may be performed on the system 100 at regular intervals. The silica filters 300 may be designed to be replaced during one of the regular maintenance performances. In addition, silica filters 300 may be placed in the engine 102, the exhaust system 104, and/or the EGR system 122 to protect any component of system 100 from silica deposits formed from silica formed in the engine combustion process from siloxanes in the intake air.

The silica filter 300 may be placed between an upstream portion 130, and a downstream portion 132 of the exhaust system 104. Alternatively, the silica filter 300 may be placed between the engine manifold 128 and the exhaust system 104, in the EGR system 122, or anywhere else in system 100 to prevent silica deposits from forming on components. In the illustrated embodiment the upstream portion 130 includes the turbine 114 and a regeneration system 136. However, in some embodiments the turbine 114 and/or the regeneration system 136 may be in the downstream portion 132. Aftertreatment components which may be damaged by siloxanes in exhaust gases may be included in the downstream portion 132. In some embodiments, more than one silica filter 300 may be included and the upstream portion 130 and the downstream portion 132 may be different in relation to each silica filter 300. A service access 156 allows access into the exhaust system 104 to service the silica filter 300. The silica filter 300 may be removed from, and a new silica filter 300 placed in the exhaust system 104 through the service access 156.

Depending on the environment the system 100 operates in, the aftertreatment system 134 may take a variety of forms as is known in the art. In the exemplary embodiment illustrated, the aftertreatment system includes a first canister 138 and a second canister 140, both of which enclose various aftertreatment components. Each of the canisters 138, 140 include a canister gas inlet 164 and a canister gas outlet 166. The first canister 138 includes a canister first end 168, a canister second end 170, a silica filter compartment 158, and a service access cover 160. In one embodiment, and for one silica filter 300, the service access cover 160 may comprise the service access 156. In the embodiment illustrated, the service access cover 160 includes a removable canister end cap 162 located on the canister first end 168. The silica filter compartment 158 may be accessed through the canister end cap 162. The first canister 138 may be cylindrically shaped with cylindrical sidewalls, and the canister gas inlet 164 may be located in the cylindrical sidewalls and open into the silica filter compartment 158.

The first canister 138 may enclose the DOC 172 and the DPF 174, and define a canister flow path 186 through the silica filter 300, the DOC 172, and the DPF 174. Exhaust gases may flow into the first canister 138 through the canister gas inlet 164, into the silica filter compartment 158 and through the silica filter 300, through the DOC 172, through the DPF 174, and out the canister gas outlet 166.

A liquid urea solution may be added to the exhaust gas with a urea injector 176, and a mixer 178 may mix the urea and exhaust gases in a conduit between the first canister 138 and the second canister 140. The second canister 140 may enclose additional aftertreatment components. In the illustrated embodiment, the second canister 140 encloses the SCR 180 and the AMOX 182. The exhaust gas may flow into the second canister 140 through the canister gas inlet 164, through the SCR 180, through the AMOX 182, out of the second canister 140 through the canister gas outlet 166 and into the environment through an exhaust gas outlet 184.

A silica filter 300 may be additionally or alternatively located in at least one of a first conduit 142 and a second conduit 150. The first conduit 142 may include a first connection portion 144, and the second conduit 150 may include a second connection portion 152. The first connection portion 144 may be configured to fixedly connect and disconnect with the second connection portion 152 creating the service access 156. The silica filter 300 may be placed in and removed from at least one of the first conduit 142 and the second conduit 150 through the service access 156. The first conduit 142 may include a first inner cylindrical surface 148, and the second conduit 150 may include a second inner cylindrical surface 154. As seen more clearly in relation to FIGS. 6 and 7, the silica filter 300 may include a filter housing 302 with cylindrical sides 310 having an outer sidewall surface 324, and a filter radial flange 322. When the silica filter 300 is placed in the exhaust system 104, the outer sidewall surface 324 of the filter housing 302 may abut at least one of the first inner cylindrical surface 148, and the second inner cylindrical surface 154. The first connection portion 144 and the second connection portion 152 may include a first radial flange 146 and a second radial flange 153 respectively. The filter radial flange 322 may be fixedly and removably connected to and between the first radial flange 146 and the second radial flange 153. In alternative embodiments, other attachment devices or schemes to removably place and retain the silica filter 300 in at least one of the first conduit 142 and the second conduit 150 may be used as known in the art.

Figure 2:
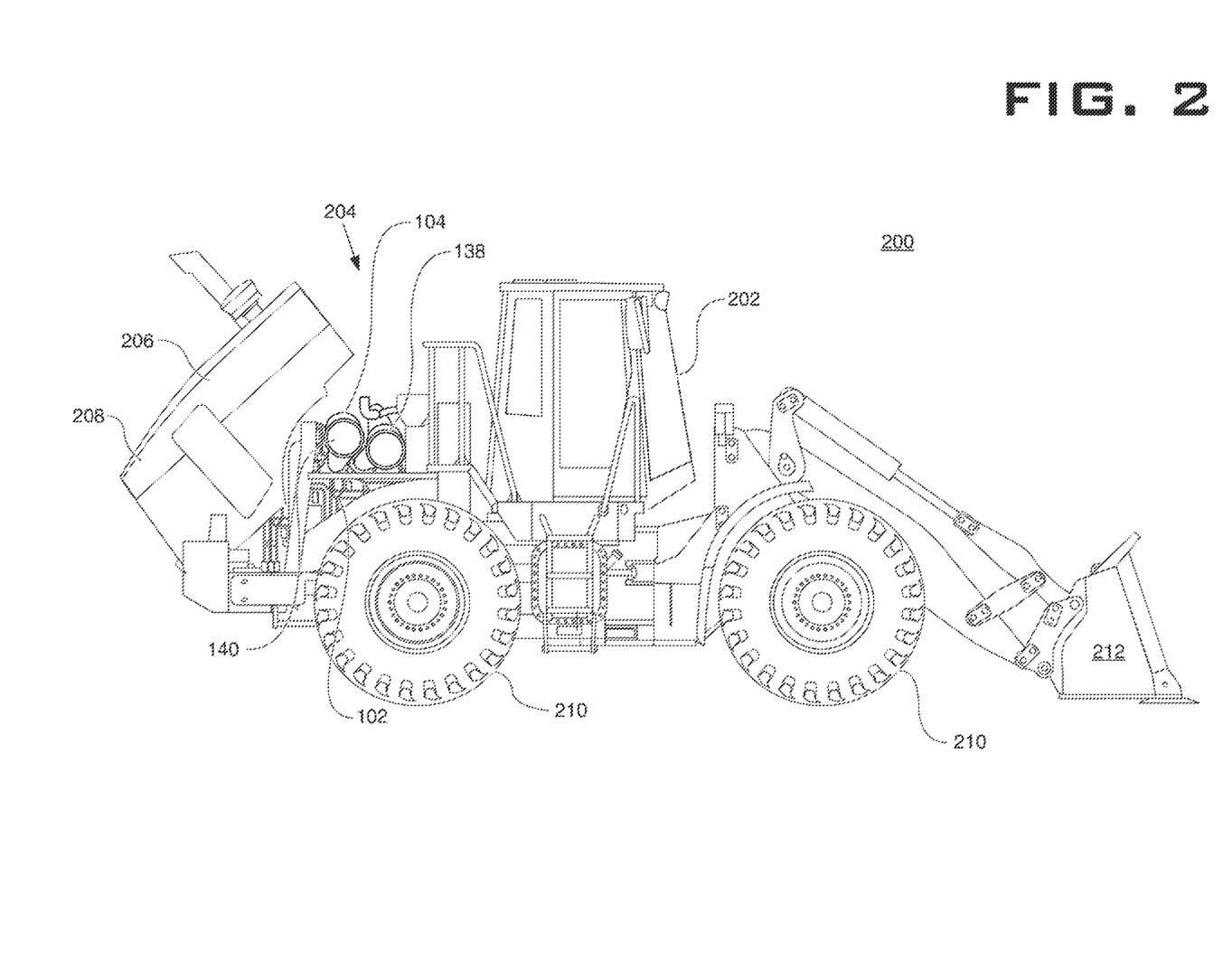
FIG. 2 is a side view of an exemplary work machine, according to an exemplary embodiment of the present disclosure.

Referring now to FIG. 2, a work machine 200 in which the system 100 may be installed is illustrated. In the illustrated embodiment, the work machine comprises a wheel loader 202, but in alternative embodiments the work machine 200 may comprise other mobile, as well as immobile work machines 200, such as, but not limited to bull dozers, tracker loaders, compactors, excavators, off-road and on-road trucks, backhoe loaders, pavers, electric generator sets, crushers, or other work machines 200 known in the art. The work machine 200 may operate, at least in part, in a waste transfer station, a landfill and/or other environments in which siloxanes are present in the air coming into the system 100 through the air intake 106. The work machine 200 may include the engine 102 to provide motive power through ground engaging devices 210, and power to one or more work tools 212.

The work machine 200 may include an engine compartment 204 in which the engine 102 and at least part of the exhaust system 104 are located. The system 100 may be accessed in the engine compartment 204 through an access door 206. In the embodiment illustrated the access door 206 includes a hood 208 which may pivotally open and close. In other embodiments, the access door 206 may take other forms such as a door in a body of the work machine 202. The hood 208 is illustrated in an open position. When the hood 208 is in the open position, the service access 156 may be accessible such that the silica filter 300 may be changed. In the illustrated embodiment, the first canister 138, and thus the canister end cap 162, may be accessed when the hood 208 is open.

Figure 3:
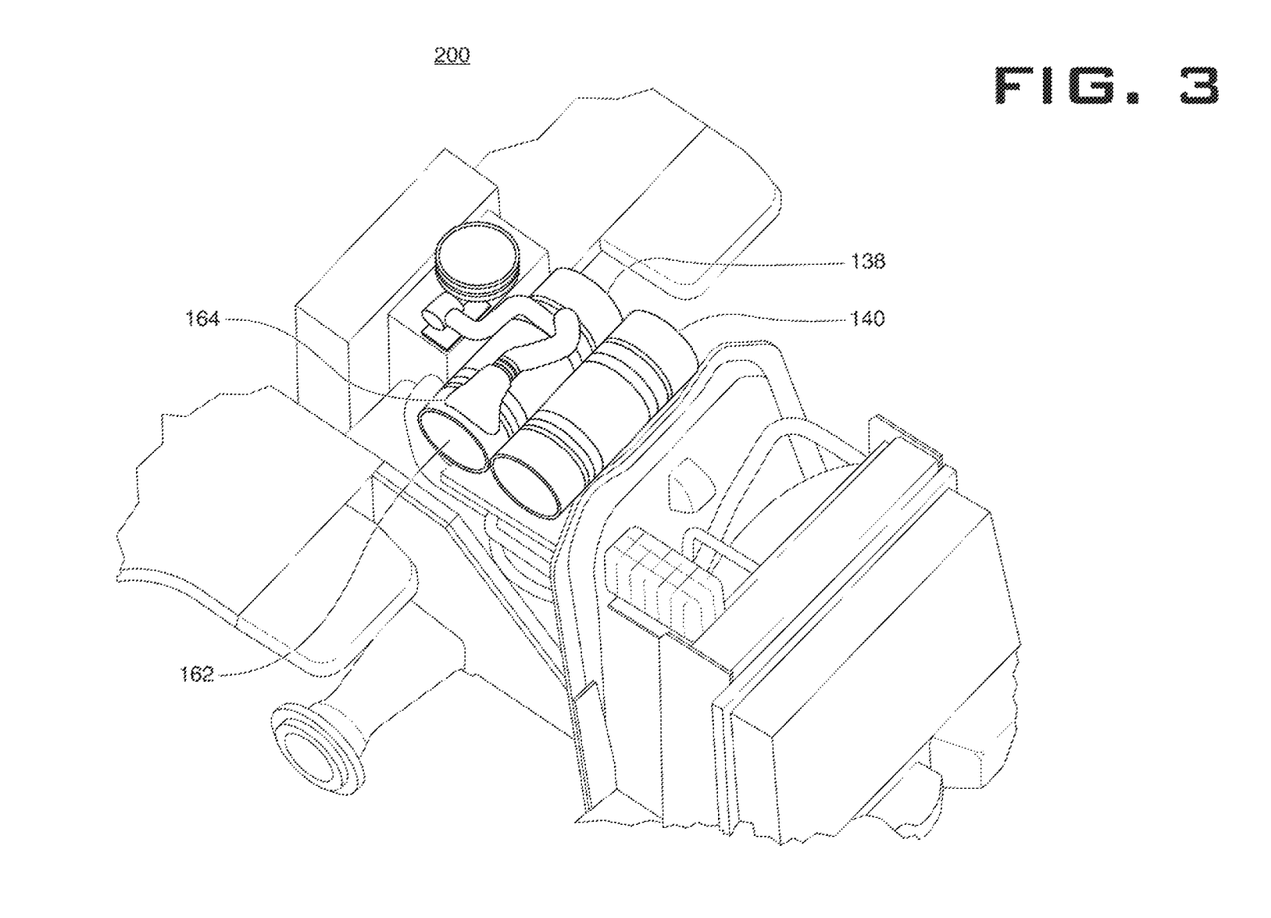
FIG. 3 is a perspective view of portions of an engine and exhaust system in a compartment of a work machine, according to an exemplary embodiment of the present disclosure.

Referring now to FIG. 3, a perspective view of the system 100 in the work machine 200 is shown. The canister end cap 162 is in a readily accessible position allowing the replacement of the silica filter 300 within the first canister 138 during regular maintenance.

Figures 4, 5:
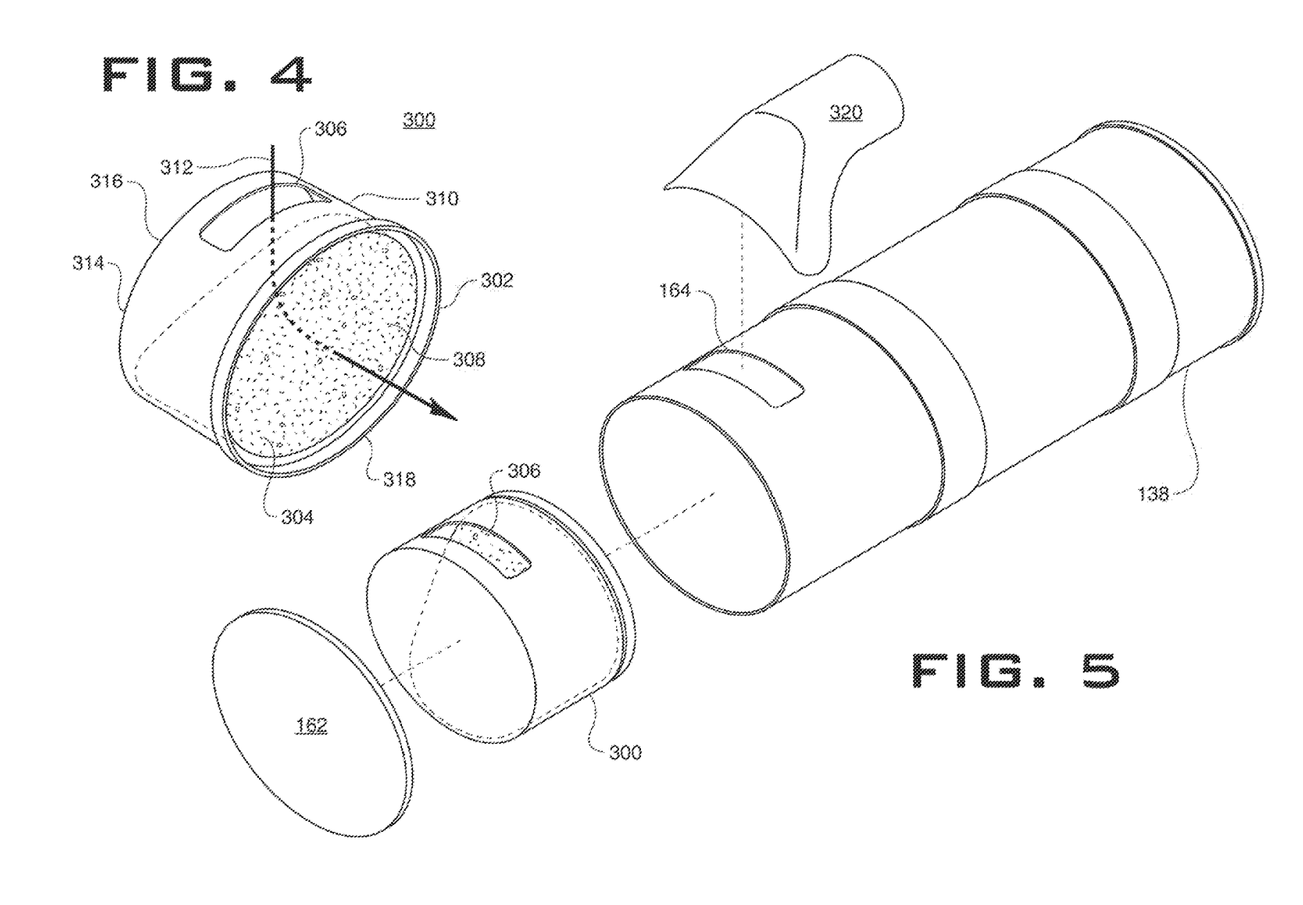
FIG. 4 is a perspective view of a first embodiment of a silica filter, according to an exemplary embodiment of the present disclosure.
FIG. 5 is an expanded perspective view of an aftertreatment canister and the silica filter of FIG. 4, according to an exemplary embodiment of the present disclosure.

Referring now to FIG. 4, a first exemplary embodiment of the silica filter 300 is illustrated. The silica filter 300 includes a silica filter element 304 and a filter housing 302 enclosing the silica filter element 304. The housing 302 includes a filter gas inlet 306 and a filter gas outlet 308 and defines a filter flow path 312 through the silica filter element 304 between the filter gas inlet 306 and the filter gas outlet 308. The filter housing 302 is configured to be removably placed within the silica filter compartment 158 through the service access cover 160, such that the canister flow path 186 includes the filter flow path 312.

The filter housing 302 may be generally cylindrically shaped, including cylindrical sides 310, a filter first end 314, and a filter second end 318. The filter first end 314 may include a filter end cap 316 fixedly connected to the cylindrical sides 310. The filter second end 318 may be open, as illustrated, or in alternative embodiments may have an aperture. The filter gas inlet 306 may be located in the cylindrical sides 310, and the filter gas outlet 308 may be located at the filter second end 318. The filter gas inlet 306 may, for example, comprise an aperture through the cylindrical side walls 310. The filter gas outlet 308 may comprise, as illustrated, the open filter second end 308. Alternatively, the filter gas outlet 308 may comprise an aperture located at the filter second end 318. The silica filter element 304 may be enclosed by the filter housing 302 such that all the exhaust gas flowing through the filter flow path 312, flows through the silica filter element 304. Any silica formed from the combustion of siloxanes may thus be removed from the exhaust gases flowing through the filter flow path 312.

The filter housing 302 may be made of metal, a metal alloy, plastic, ceramic, a composite of any of these, or any other solid material which may be able to withstand and hold the filter housing 302 form and shape at the temperatures of exhaust gases in the exhaust system 104. The filter housing 302 may also be made of a material to withstand corrosion from elements of the exhaust gases. These exhaust gases may be at very hot temperatures, especially when a regeneration system 136 is included in the exhaust system 104. The filter housing 302 may be made of materials which may be able to withstand the environment in which the work machine 200 operates in.

The silica filter element 304 may be composed of material, such as silicon carbide, stainless steel, cordierite, aluminum titanate, mild steel, fiber, or other metallic compound known in the art. The material composition of the silica filter element 304 is selected based on material properties required to withstand engine-out exhaust temperatures and exhaust gas composition, and have a strong adhesion with the silica. The silica filter element 304 may be constructed of woven material, non-woven material, monolithic structures, pleated material, mesh, porous supports, foams, arrays of cells, honeycombs, or combinations thereof. Further, the silica filter element 304 may be bare or coated with a high surface area catalyst support, such as alumina. The silica filter element 304 is structured to allow silica in the exhaust gases to be deposited uniformly on the silica filter element 304.

Figure 9:
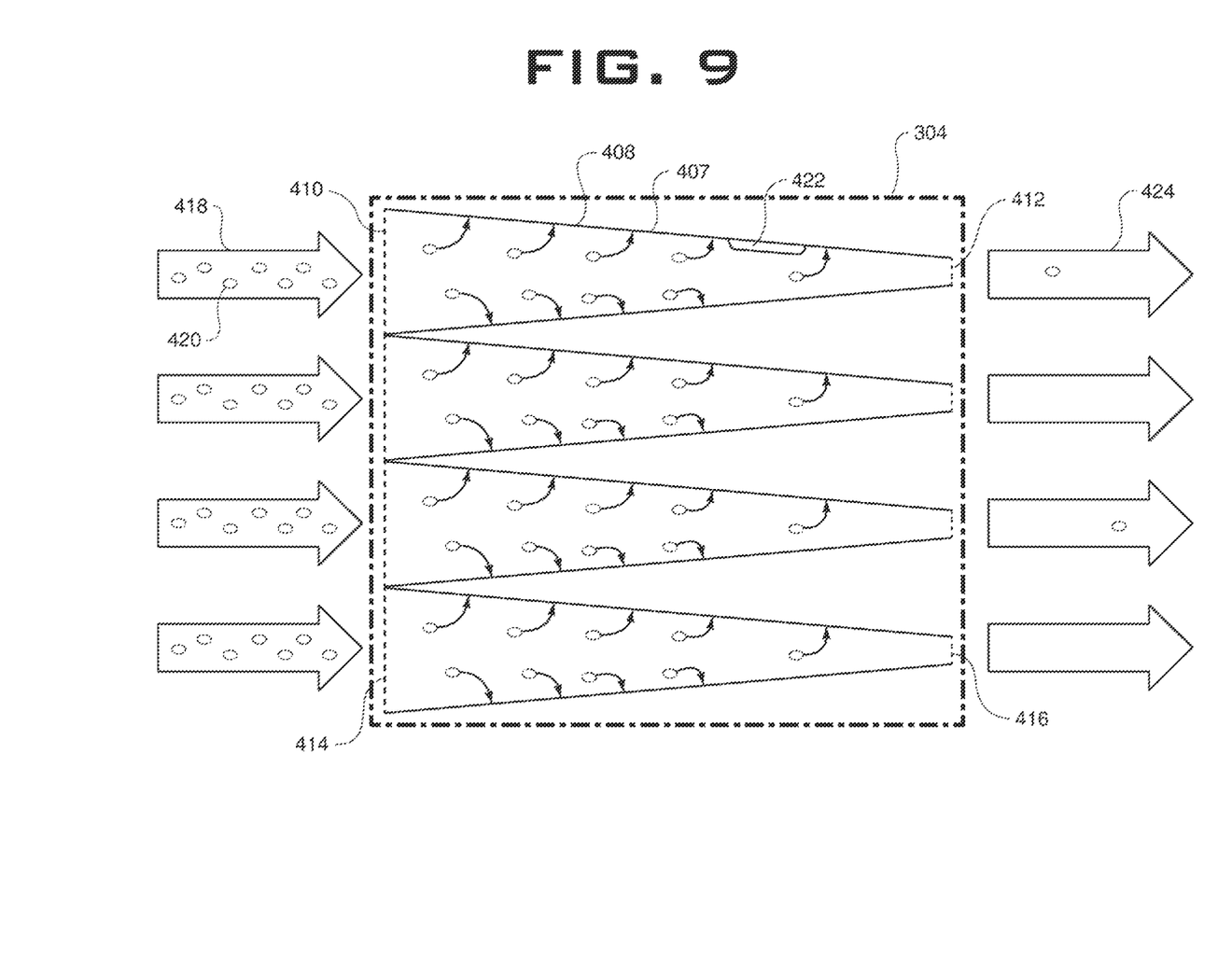
FIG. 9 is a schematic of a second exemplary embodiment of a silica filter element, according to an exemplary embodiment of the present disclosure.

The silica filter element 304 may include a plurality of filter channels 407 (shown in relation to FIG. 9). The filter channels 407 may be of square, triangular, hexagonal, sinusoidal, or other shapes known in the art. The filter channels 407 may have an axial geometry, which may be uniform or tapered. However, the shape, size, and geometry of the filter channels 407 does not limit the disclosed idea. The silica filter element 304 may be adapted to have varied permeability, pore size, wall or fiber thickness, and cells per square inch (cpsi).

In the illustrated embodiment the silica filter element 304 is cylindrically shaped with one side of the cylinder shorter than the other to allow exhaust gases entering through the filter gas inlet 306 to flow through the silica filter element 304.

Referring now to FIG. 5, an expanded view of the first canister 138 and the silica filter 300 is illustrated. A cobra head 320 may direct exhaust gases into the canister gas inlet 164 and filter gas inlet 306. The canister gas inlet 164 and filter gas inlet 306 may be oriented to be adjacent to each other when the silica filter 300 is placed in the silica filter compartment 158. The canister end cap 162 may be removed to replace the silica filter 300 in the silica filter compartment 158.

Figure 6:
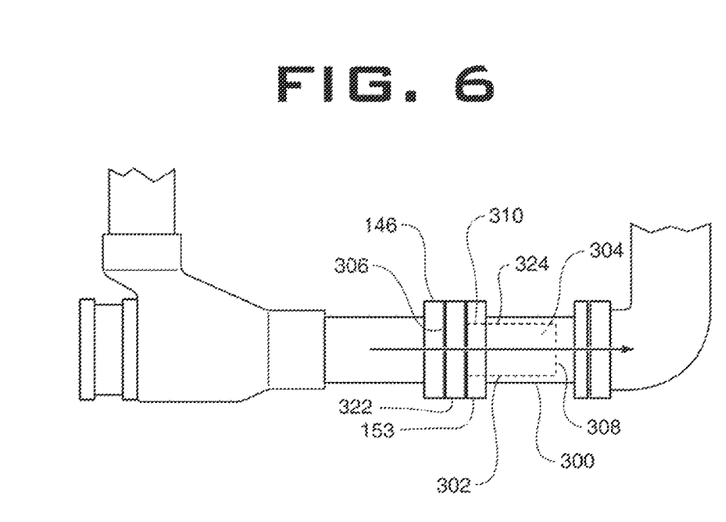
FIG. 6 is a side view of a second embodiment of a silica filter in a portion of an exhaust system with a service access in a closed position, according to an exemplary embodiment of the present disclosure.
Figure 7:
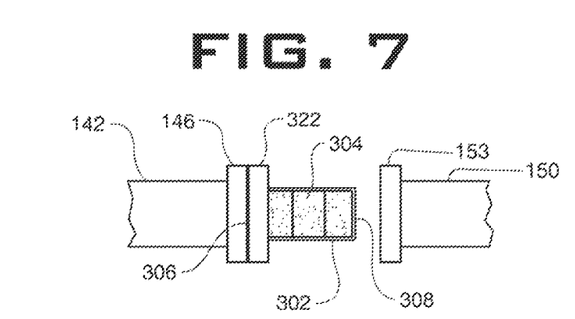
FIG. 7 is a side cross sectional view of the silica filter and exhaust system of FIG. 6 with the service access in an open position, according to an exemplary embodiment of the present disclosure.

Referring now to FIG. 6, a second exemplary embodiment of the silica filter 300 is illustrated in part of the exhaust system 104. The silica filter 300 includes a silica filter element 304 and a filter housing 302 enclosing the silica filter element 304. The filter housing 302 includes a filter gas inlet 306 and a filter gas outlet 308, and defines a filter flow path 312 through the silica filter element 304 between the filter gas inlet 306 and the filter gas outlet 308. The filter housing 302 is configured to be fixedly and removably placed within at least one of the first conduit 142 and the second conduit 150 through the service access 156 such that the exhaust flow path includes the filter flow path 312. The service access 156 is illustrated in a closed position. FIG. 7 illustrates the service access in an open position.

Figure 8:
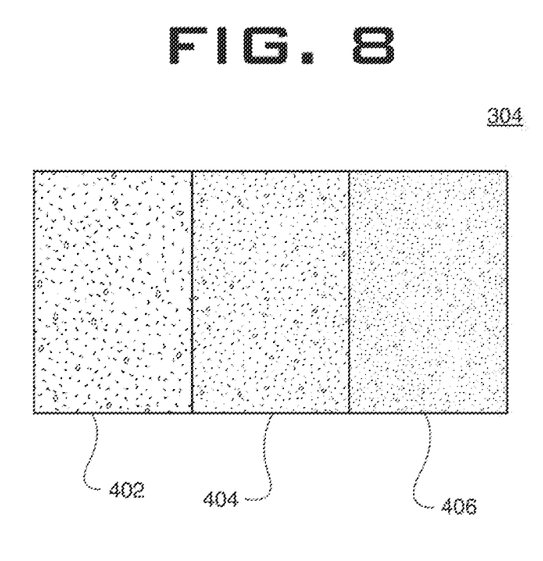
FIG. 8 is a schematic view of a first exemplary embodiment of a silica filter element, according to an exemplary embodiment of the present disclosure.

Referring now to FIG. 8, a schematic diagram of an exemplary embodiment of the silica filter element 304 is illustrated. The silica filter element 304 may include a coarse section 402, a medium section 404, and a fine section 406. The coarse section 402 may act as an inlet section for exhaust gases flowing in the filter flow path 312. The coarse section 402 may be removably coupled to the medium section 404. The medium section 404 may be positioned downstream of the coarse section 402 and upstream from the fine section 406. The medium section 404 may filter finer particles than the coarse section 402. The medium section 404 may be removably coupled to the fine section 406. The fine section 406 may act as an outlet section for exhaust gases flowing in the filter flow path 312. The exhaust gases may then flow through aftertreatment components downstream of the silica filter element 304.

Each of the coarse section 402, the medium section 404, and the fine section 406 may refer to pore size, permeability, wall or fiber thickness, or cpsi of the corresponding section of the silica filter element 304. In one embodiment, the coarse section 402, the medium section 404, and the fine section 406 may refer to a general or average cross sectional area of filter channels 407 in the silica filter element 304. In the coarse section 402 the cross sectional areas of the filter channels 407 may be generally larger than the cross sectional areas of filter channels 407 in the medium section 404. In the medium section 404 the cross sectional areas of the filter channels 407 may be generally larger than the cross sectional areas of filter channels 407 in the fine section 406. Hence, each of the coarse section 402, the medium section 404, and the fine section 406 may exhibit a different capability to remove silica from the exhaust gases. The capability of the silica filter element 304 to remove silica from exhaust gases may increase from the coarse section 402 to the fine section 406 as the concentration of silica in the exhaust gases decreases due to the filtering in previous sections.

In one embodiment the coarse section 402 has the lowest cpsi and the fine section 406 has the highest cpsi. The cpsi of the medium section 404 may lie between the cpsi of the coarse section 402 and the fine section 406. In an embodiment, the silica filter element 304 may include one or more sections positioned downstream from the fine section 406 which may exhibit cpsi finer or higher than the fine section 406.

The increasing cpsi of the silica filter element 304 is one way to achieve uniform silica distribution. Hence, the silica filter element 304 may be equipped with more sections or less sections, which continuously vary from lower cpsi to higher cpsi. In another embodiment, the coarse section 402, the medium section 404, and the fine section 406 may form a single unit, instead of being removably attached. Alternatively, the cpsi of the silica filter element 304 may continuously and uniformly transition from lower to higher cpsi.

Referring now to FIG. 9, there is shown a schematic depiction of another embodiment of the silica filter element 304, including multiple filter channels 407 comprising tapered channels 408. The silica filter element 304 may also be structured to achieve uniform siloxane distribution. Exhaust gases, depicted by arrows 418 may flow into the tapered channels 408 of filter element 304. The exhaust gases 418 entering the filter element may include silica 420 (depicted as small ellipses), which may be molecular silica, and may be diffused throughout the entering exhaust gases 418. The silica 420 may come into contact with walls of the tapered channels 408, condense, and form silica deposits 422. The larger inlet channels will prevent face plugging. The tapering of tapered channels 408 may be deliberately exaggerated for illustration purposes. The tapered channels 408 may include a channel inlet 410 with an inlet cross sectional area 414, and a channel outlet 412 with an outlet cross sectional area 416. The inlet cross sectional area 414 may be greater than the outlet cross sectional area 416. As the exhaust gases move through the tapered channels 408, silica 420 is removed. Thus there may be less silica in the exhaust gases as they get nearer the channel outlet 412 than when the exhaust gases entered the channel inlet 410. Because the tapered channels 408 taper the silica 420 may more evenly distribute along the tapered channel 408. When the exhaust gases exit the filter element 304 (as illustrated by arrows 424) most, if not all, of the silica 420 has been removed from the exiting exhaust gases 424.

In embodiments where the DPF 174 is downstream of the silica filter 300, the channels 407, pores, or other pathways of the filter element 304 through which the exhaust gases flow may be large enough for particulate matter to pass through. This may extend the interval before the filter 300 must be changed by preventing the particulate matter from clogging the filter element 304. The silica 420 may form deposits on the walls of the channels 407, while the particulate matter passes through.

In some embodiments, the silica filter 300 may be designed to generate a turbulent flow of the exhaust gases through the filter element 304, which may increase the transfer of the silica 420 to the walls of channels 407. In other embodiments, one or more mixers (not shown) as known in the art, may be included upstream of the filter element 304 in the flow path 312, or in the exhaust system 104 upstream of the filter gas inlet 306.

INDUSTRIAL APPLICABILITY

Work machines 200 may operate in waste transfer facilities, landfill sites, or other environments where they may draw siloxanes into air intakes such as engine air intakes 106. The siloxanes may combust in the engine 102 and form silica 420. The silica 420 may contact and stick to surfaces inside the engine 102 and/or in an exhaust system 104 of the engine 102 forming silica deposits 422. The silica deposits 422 may build up on exhaust aftertreatment components leading to restriction of the exhaust flow, which may increase backpressure to the engine 102, and create an increase in regeneration frequency in some aftertreatment components due to aftertreatment controls not accounting for back pressure increases related to silica deposition. Additionally, sensors can be coated or plugged, causing inaccurate readings or delayed response. High concentrations of siloxanes in the ambient air may severely affect the maintenance intervals of the engine 102, exhaust system 104 and/or work machine 200. There may be much more downtime and more parts to replace.

Silica filters 300 may be placed in the exhaust system 104 to filter silica 420, formed from the oxidation of siloxanes, from the exhaust gas which may protect aftertreatment components downstream of the silica filters 300. The silica filter elements 304 of the silica filters 300 may be structured to create a uniform distribution of silica deposits 422 throughout the silica filter element 304 to increase the life of the silica filter 300. The silica filter 300 and exhaust system 104 may be configured to allow replacement of the silica filter 300 through a service access 156 during regular maintenance of the work machine 200 or engine 102.

It should be understood, of course, that the foregoing relates to exemplary embodiments of the invention and that modifications may be made without departing from the spirit and scope of the invention as set forth in the following claims.

What is claimed is:

1. An exhaust system for an engine defining an exhaust gas flow path from the engine to an outside environment, comprising:
   an upstream portion;
   a downstream portion including an aftertreatment component, the aftertreatment component including at least one of a diesel particulate filter, a diesel oxidation catalyst, a lean NOx trap, a lean NOx catalyst, a NOx adsorber, and an aftertreatment device including a selective catalytic reduction catalyst and a reductant injection device;
   a service access between the upstream portion and the downstream portion; and
   a silica filter including a silica filter element and a housing enclosing the silica filter element, the housing including a filter gas inlet and a filter gas outlet, the housing defining a filter flow path through the silica filter element between the filter gas inlet and the filter gas outlet, the filter element configured to filter silica from exhaust gases of the engine and structured to create a uniform distribution of silica throughout the silica filter element, the silica filter configured to be removed and replaced through the service access, the silica filter element including a coarse section, a medium section, and a fine section, the fine section configured to filter finer particles than the medium section, the medium section configured to filter finer particles than the coarse section; and
   wherein all exhaust gases which flow through the aftertreatment component flow through the silica filter element before flowing through the aftertreatment component.

2. The exhaust system of claim 1, wherein the aftertreatment component comprises the diesel particulate filter.

3. The exhaust system of claim 1, wherein the aftertreatment component comprises the diesel oxidation catalyst.

4. The exhaust system of claim 1, wherein the aftertreatment component comprises the aftertreatment device including the selective catalytic reduction catalyst and the reductant injection device.

5. The exhaust system of claim 1, further including a turbine of a turbocharger, the turbine upstream of the silica filter.

6. The exhaust system of claim 1, wherein the engine provides power for a work machine.

7. The exhaust system of claim 6 wherein:
   the work machine includes an engine compartment with an access door, the access door having an open position; and
   the service access is accessible when the access door is in the open position.

8. A silica filter for an exhaust system of an engine, the exhaust system including an aftertreatment canister with a silica filter compartment, a removable service access cover providing access to the silica filter compartment, and at least one aftertreatment component, the canister defining a canister flow path flowing through the silica filter compartment and the aftertreatment component, comprising:
   a silica filter element configured to filter silica from exhaust gases flowing in the canister flow path and structured to create a uniform distribution of the silica throughout the silica filter element, the silica filter element including a coarse section, a medium section, and a fine section, the fine section configured to filter finer particles than the medium section, the medium section configured to filter finer particles than the coarse section; and a filter housing enclosing the filter element and including a filter gas inlet and a filter gas outlet, the filter housing defining a filter flow path through the silica filter element between the filter gas inlet and the filter gas outlet; and wherein the filter housing is configured to be removably placed within the silica filter compartment through the service access cover such that the canister flow path includes the filter flow path.

9. The silica filter of claim 8, wherein the filter housing is configured to be removably placed within the silica filter compartment such that the filter gas outlet is downstream of the fine section, the fine section is downstream of the medium section, the medium section is downstream of the coarse section, and the coarse section is downstream of the filter gas inlet.

10. The silica filter of claim 8, wherein the coarse section is removably coupled to the medium section, and the medium section is removably coupled to the fine section.

11. The silica filter of claim 8 wherein the canister is cylindrically shaped and includes a canister gas inlet, a canister gas outlet, a first canister end with a canister end cap, and second canister end, and wherein the service access cover includes the canister end cap.

12. The silica filter of claim 8 wherein the filter housing is cylindrically shaped and includes filter cylindrical sides, a first filter end with a filter end cap fixedly attached to the filter cylindrical sides, and a second filter end, the filter cylindrical sides including the filter gas inlet, and the second filter end including the filter gas outlet.

13. The silica filter of claim 8 wherein:
the canister is located in a compartment with an access door, the access door having an open position; and
the service access cover is accessible when the access door is in the open position.

14. The silica filter of claim 8, wherein the silica filter element includes multiple tapered channels, each tapered channel including a channel inlet with an inlet cross sectional area, and a channel outlet with an outlet cross sectional area, the inlet cross sectional area greater than the outlet cross sectional area.

15. A silica filter for an exhaust system of an engine, the exhaust system including an aftertreatment component, a first conduit with a first connection portion, and a second conduit with a second connection portion, the first connection portion configured to fixedly connect and disconnect with the second connection portion creating a service access upstream of the aftertreatment component, the exhaust system defining an exhaust flow path from the engine to an outside environment through the first conduit, the second conduit, and the aftertreatment component, comprising:

a silica filter element; configured to filter silica from exhaust gases flowing in the exhaust flow path and structured to create a uniform distribution of the silica throughout the silica filter element, the silica filter element including a coarse section, a medium section, and a fine section, the fine section configured to filter finer particles than the medium section, the medium section configured to filter finer particles than the coarse section; and a filter housing enclosing the silica filter element and including a filter gas inlet, and a filter gas outlet, the filter housing defining a filter flow path through the silica filter element between the filter gas inlet and the filter gas outlet; and wherein the filter housing is configured to be fixedly and removably placed within at least one of the first conduit and the second conduit through the service access such that all exhaust gases flowing through the exhaust flow path flow through the silica filter element.

16. The silica filter of claim 15, wherein:
the first connection portion includes a first radial flange, the second connection portion includes a second radial flange, the filter housing includes a filter radial flange; and
the filter housing flange is configured to be fixedly and removably connected to and between the first radial flange and the second radial flange.

17. The silica filter of claim 15, wherein:
the filter housing is cylindrically shaped and includes cylindrical sidewalls with an outer sidewall surface;
at least one of the first conduit and the second conduit includes an inner cylindrical surface;
the filter housing is configured to be fixedly and removably placed within at least one of the first conduit and the second conduit such that at least a portion of the outer sidewall surface abuts the inner cylindrical surface.

18. The silica filter of claim 15 wherein the silica filter element includes multiple tapered channels, each tapered channel including a channel inlet with an inlet cross sectional area, and a channel outlet with an outlet cross sectional area, the inlet cross sectional area greater than the outlet cross sectional area.

* * * * *